Dec. 29, 1970   R. B. WHITESIDE ET AL   3,551,015
RIVET AND COLLAR UNIT AND JOINT FORMED THEREBY
Original Filed March 1, 1968   2 Sheets-Sheet 1

INVENTORS
ROGER B. WHITESIDE
BY HARRY T. LONG, JR.

*Andrew L. Ney*
ATTORNEY

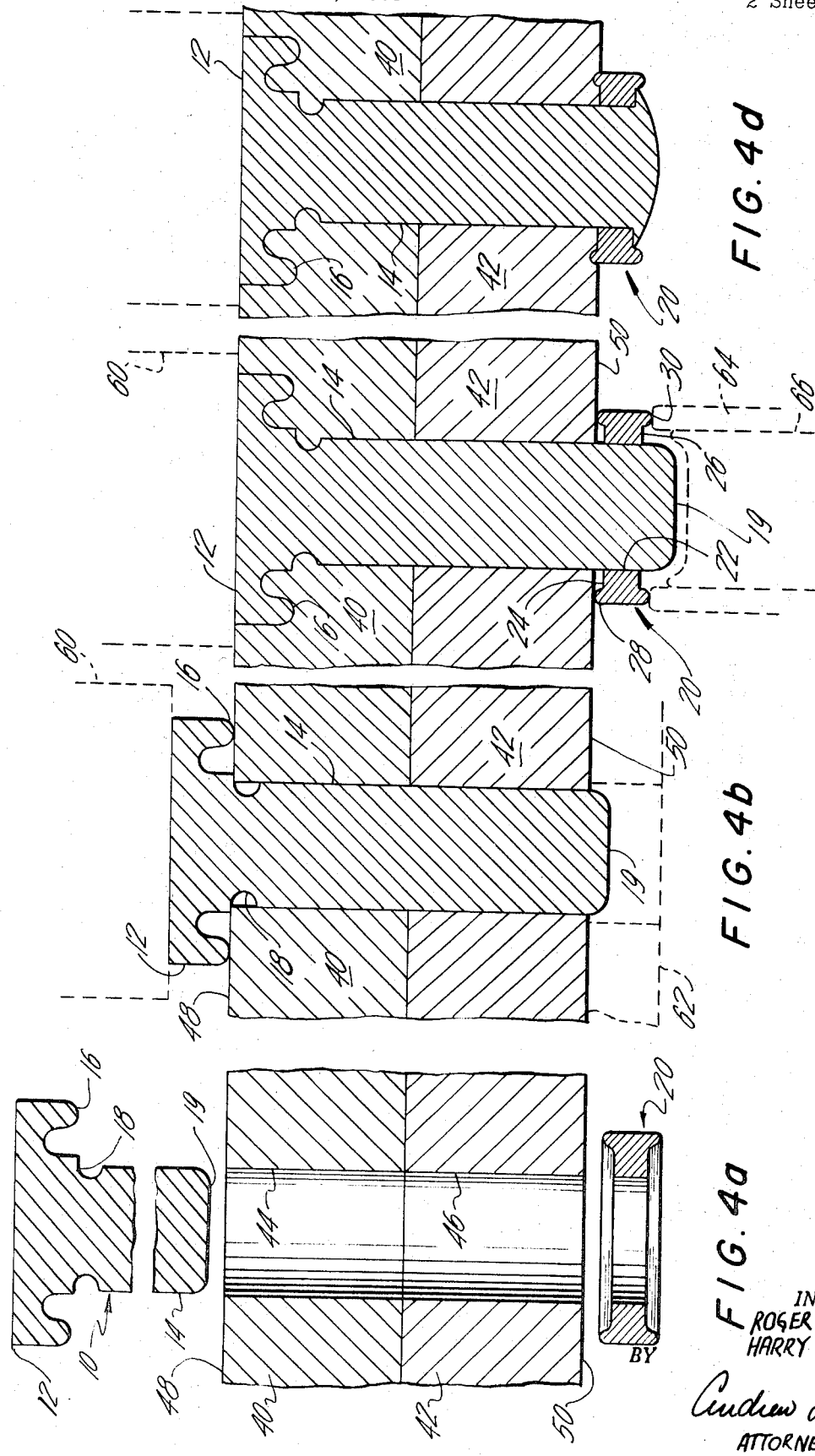

United States Patent Office 3,551,015
Patented Dec. 29, 1970

3,551,015
RIVET AND COLLAR UNIT AND JOINT FORMED THEREBY

Roger B. Whiteside, Cinnaminson, N.J., and Harry T. Long, Jr., Jamison, Pa., assignors to Standard Pressed Steel Co., Jenkintown, Pa., a corporation of Pennsylvania
Continuation of application Ser. No. 709,654, Mar. 1, 1968. This application Apr. 2, 1969, Ser. No. 859,533
Int. Cl. F16b 19/04
U.S. Cl. 287—189.36         18 Claims

ABSTRACT OF THE DISCLOSURE

A rivet and collar combination wherein the rivet head and the collar are adapted to be embedded in opposite outside surfaces of a stack of members which are to be secured together. The embedding of these parts causes the displacement of material in the stack members and the development of residual compressive stresses in the stack around a hole through which the rivet shank extends. As the tail of the rivet is upset, the shank expands radially to develop an interference fit between the shank and the hole which results in the development of residual tensile stresses superimposed upon the previously developed residual compressive stresses.

---

This application is a continuation of copending application Ser. No. 709,654, now abandoned.

The present invention relates, in general, to fastening devices and, in particular, to a rivet and collar combination for securing a plurality of members together and a method of increasing the fatigue strength of these members.

Because of the severe requirements of the high-speed, heavier aircraft presently being developed, much time and effort is being devoted to the development of new fastening devices and techniques for installing these devices. Among the factors which must be considered in any of these developments are the load handling requirements of the aircraft and the environmental conditions to which the aircraft will be subjected. While safety and structural integrity are of paramount importance, the costs of the fastening devices and the cost of their installation also are important.

One particular area receiving a great deal of attention by the designers of fasteners and aircraft is the securing of panels to substructures. These panels form the "skin" of the aircraft and provide the desired surface for aerodynamic purposes as well as structural strength to the air frame. As a result, these panels are subjected to considerable forces and elemental conditions. In the choice of a fastener for this application, as well as others, consideration must be given to the strength of the fastener itself and the effect of the fastener on the structure into which it is installed. While a properly designed fastener in a properly designed structure does not fail in fatigue, the fastener does introduce stress around the hole into which it is installed so that the structure eventually will fail in fatigue. For this reason, fasteners are selected which contribute the least amount of fatigue damage to the structure. This, in turn, permits using less structural material which results in a reduction in weight and cost.

In order to increase the fatigue strength characteristics of aircraft structures, it is presently a common practice to pre-condition the structures in the vicinity of holes so that an actual stress is retained around the holes when the structure is unloaded. This condition, for example, may be achieved by the development of a residual tensile stress which is the result of the radial expansion of a hole as a fastener having a body which is greater than the original hole size is installed. Alternatively, the desired prestress may be achieved by the development of a residual compressive stress which is the reult of the radial contraction of a hole as the surface of a member, in the vicinity of a hole, is coined by a tool.

Generally, the fasteners which are available at the present time for securing panels to substructures and the techniques of hole preparation presently in use suffer from one or more shortcomings. Although in many cases there is a reduction in the stress amplitude to which panels are subjected under load, in most instances the maximum stresses are higher than desired and bring about failure in fatigue too early. Many fasteners presently in use are relatively expensive and the costs in installing many fasteners are undesirably high. For example, tapered fasteners, because of their configuration, are difficult to fabricate. In addition, when installed in a tapered hole the cost of hole preparation is higher than desired. Furthermore, because of aerodynamic considerations, panel fasteners are installed so that their heads are flush with the panel outer surface. As a result, the holes into which the fasteners are installed must be countersunk or counterbored. This tends to weaken the joint and also adds to the installation cost. Likewise, the coining of a hole with a tool requires an extra step in the assembly of a structure which adds to the cost of installing a fastener.

Accordingly, it is an object of the present invention to provide a new and improved fastener unit.

It is another object of the present invention to provide a fastener unit having particular application in aircraft for securing panels to substructures.

It is a further object of the present invention to provide a fastener unit which conditions a panel so that the stresses to which the panel is subjected under load are considerably lower than achieved by present practices.

It is yet another object of the present invention to provide a fastener unit which is relatively simple in construction and inexpensive to fabricate and install.

These objects, as well as others, are achieved according to a preferred embodiment of the present invention by providing a rivet and a collar, each being adapted to be embedded in the opposite outside surfaces of two structural members which are to be secured together. As the rivet and the collar are embedded in these structural members, there is a displacement of material in these members resulting in the development of residual compressive stresses around a hole extending between the two outside surfaces and through which the shank of the rivet extends. As the tail of the rivet is upset, the shank expands radially to develop an interference fit between the shank and the structural members so that residual tensile stresses are developed which are superimposed upon the residual compressive stresses previously developed. The rivet is clinched positively in one of the structural members by providing an annular groove in the rivet shank near the rivet head. Material displaced by the rivet flows into this groove as the rivet is embedded in this structural member. Clamp-up of the joint is achieved as the tail of the rivet is upset against the collar which, in turn, bears against the outside surface of the other structural member.

For a better understanding of the present invention, together with other and further objects thereof, reference is made to the following description, taken in connection with the accompanying drawings, and its scope will be pointed out in the appended claims.

Referring to the drawings:

FIGS. 4a, 4b, 4c and 4d illustrate the sequence in which a rivet and collar combination constructed in accordance with the present invention installed to secure two members together.

Figure 1:
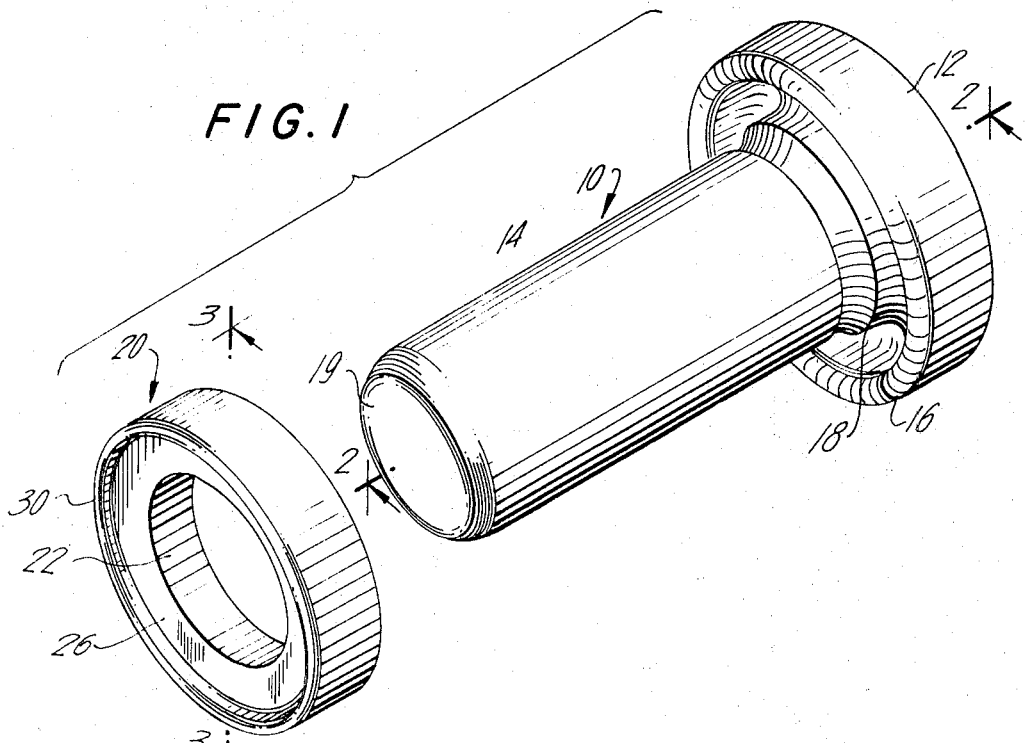
FIG. 1 is a perspective view of a rivet and collar combination constructed in accordance with the present invention.
Figure 2:
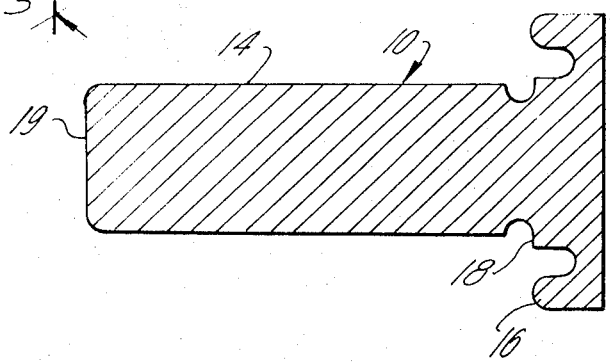
FIG. 2 is a sectional view taken along line 2—2 of FIG. 1.
Figure 3:
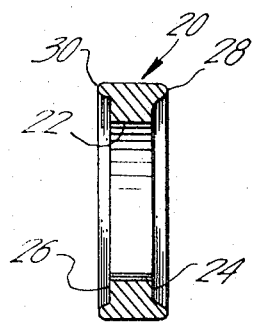
FIG. 3 is a sectional view taken along line 3—3 of FIG. 1.

Referring to FIGS. 1, 2 and 3, which illustrate a rivet and collar combination constructed in accordance with the present invention, the rivet 10 has a head 12 and a shank 14. A peripheral ridge or coining ring 16 is provided on the underside of rivet head 12. As most clearly shown in FIG. 2, for the embodiment illustrated, the cross-section of coining ring 16 is semi-circular. An annular groove 18 is provided in rivet shank 14 in the vicinity of rivet head 12.

The collar 20 has a cylindrical passage 22 extending completely through the collar from one face 24 to the opposite face 26. Each of the collar faces 24 and 26 is provided with a peripheral ridge or coining ring 28 and 30, respectively. The relative dimensions between the diameter of rivet shank 14 and collar pasasge 22 are selected for a finger fit, that is, the collar may be slipped onto the tail 19 of the rivet by hand.

FIGS. 4a, 4b, 4c and 4d are vertical sections showing the sequence of securing two structural members 40 and 42 together with a rivet and collar combination in accordance with the present invention. In FIG. 4a, rivet 10 is shown above member 40, while collar 20 is shown below member 42. Members 40 and 42 are provided with holes 44 and 46, respectively, to receive shank 14 of rivet 10. With members 40 and 42 positioned adjacent one another and holes 44 and 46 aligned, there is provided a single passage extending completely through the members from the outside surface 48 of member 40 to the outside surface 50 of member 42. Member 40 may be, for example, a panel forming part of the skin of an aircraft, while member 42 may be another panel or component part of an aircraft structure.

The fastening unit of the invention is installed by passing shank 14 of rivet 10 through holes 44 and 46 so that the underside of rivet head 12 is positioned against outside surface 48 of panel 40 and the tail 19 of the rivet projects from outside surface 50 of panel 42. This is illustrated in FIG. 4b.

Next, rivet head 12 is driven into panel 40 at outside surface 48 to embed the head in this panel. This is illustrated in FIG. 4b. The driving of rivet head 12 may be accomplished by a suitable punch 60, represented by dashed lines, which when driven downward forces the head of the rivet into panel 40. A suitable die member 62, also represented by dashed lines, is positioned beneath panel 42 to support the two panels as the rivet head is embedded in the upper panel.

As the rivet head 12 is driven into panel 40, material of this panel lying beneath the rivet head is displaced by cold flow. Some of the displaced material of panel 40 flows into annular groove 18 in shank 14 of the rivet to clinch the rivet in panel 40. Some more of this displaced material flows to take up clearance provided between the surface of hole 44 in panel 40 and rivet shank 14. The volume of the head embedded in panel 40 preferably is selected to be greater than the sum of the volume of groove 18 plus the volume of the clearance between shank 14 and panel 40. As a result, the excess in volume of the embedded head causes panel 40 to be packed in the vicinity of hole 44, thereby creating a residual compressive stress in this panel around the hole. Coining ring 16 on the underside of rivet head 12 is shaped and dimensioned to control the cold flow of the panel material to effect the desired residual compressive stress. In addition, with coining ring 16 embedded in panel 40, hole 44 in this panel is bridged by rivet head 12 so that loads in the plane of panel 40 are coupled effectively across hole 44 by the rivet head.

After rivet head 12 is embedded in panel 40, collar 20 is slipped over the tail 19 of the rivet so that collar face 24 with coining ring 28 is positioned against outside surface 50 of panel 42. This is illustrated in FIG. 4c.

Next, collar 20 is driven into panel 42 at outside surface 50 to embed ring 28 in this panel. The driving of collar 20 may be accomplished by a suitable punch 64, represented by dashed lines, which when driven upward forces the collar into panel 42. Punch 60 is kept in position above panel 40 and rivet head 12 to support the two panels as the collar is embedded in the lower panel.

As ring 28 of collar 20 is driven into panel 42, material of this panel lying above ring 28 is displaced by cold flow. Some of this displaced material takes up clearance provided between the surface of hole 46 in panel 42 and rivet shank 14. The volume of ring 28 embedded in panel 42 is selected to cause panel 42 to be packed in the vicinity of hole 46, thereby creating a residual compressive stress in this panel around the hole. Ring 28 of the collar is shaped and dimensioned to control the cold flow of the panel material to effect the desired residual compressive stress. Rings 30 is provided on collar face 26 so that the collar is symmetric and its orientation, as it is slipped over the tail 19 of the rivet, need not be checked by an assembler.

After collar 20 is embedded in panel 42, the tail 19 of rivet shank 14 is upset. This is illustrated in FIG. 4d. The upsetting of the tail of shank 14 may be accomplished by a suitable punch 66, represented by dashed lines, which when driven upward causes the shank to expand radially against the surfaces of holes 44 and 46 and the tail to flare. The radial expansion of the shank creates an interference fit between the rivet shank and panels 40 and 42 and causes material of panels 40 and 42 in the vicinity of the holes to move outwardly, thereby superimposing residual tensile stresses on the residual compressive stresses previously developed in panels 40 and 42. The extent of the radial expansion of shank 14 determines whether the deformation of panels 40 and 42 is elastic of plastic. Generally, the type of deformation selected is dependent upon the choice of panel material and its resistance to stress corrosion.

The flaring of tail 19 of the rivet drives rivet material against collar face 26 to clamp panels 40 and 42 together. At this point it is worthwhile to consider some of the results and advantages of a rivet and collar combination constructed in acordance with the present invention. In terms of fatigue strength characteristics, a number of test specimens into which this rivet and collar combination was installed, when cycled at loads which produced a stress range of 36,000 p.s.i., failed at an average of 200,000 cycles. To a large extent, this high failure level is due to the reduction of both the stress amplitude and the maximum stress to which the test specimens were subjected which results from the superimposing of residual tensile stresses on residual compressive stresses. Also contributing to this high failure level is the bridging of the hole by the rivet head.

The development of residual compressive stresses besides contributing to increased fatigue strength characteristics results in increased resistance to stress corrosion in that the panel material in the vicinity of the holes is packed, thereby reducing the size of the pores in the panel material. In addition, by eliminating the need for countersunk holes and embedding the head of the rivet, added resistance to stress corrosion in the head area is provided by the present invention in comparison to fasteners seated in countersunk holes. This is due to the conformity of the panel material to the rivet head as the head is embedded in the panel. In the case of countersunk fasteners, because of manufacturing tolerances there is the likelihood of a mismatch between the underside of the head of the fastener and the countersunk hole which increases the susceptibility of the panel to stress corrosion.

Besides the problem of stress corrosion, a mismatch between a countersunk hole and the underside of the head of a fastener results in the creation of voids which reduce the rigidity and, therefore, the integrity of the joint. In addition, when a hole is countersunk panel material necessarily is removed thereby weakening the joint.

The elimination of a countersink, besides enhancing the strength of a structural member, also reduces the cost of installing a fastener by eliminating a step in the hole preparation.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A fastening unit for securing together first and second members positioned adjacent one another and having a hole extending from the outside surface of said first member to the outside surface of said second member comprising:
   a rivet having an enlarged head adapted to be embedded in said first member at said first outside surface and a shank adapted to pass through said hole and project from said second outside surface, said head having axially projecting means being radially spaced from said shank and directed toward the free end thereof for causing a controlled cold flow of material of said first member in the vicinity of said hole as said head is embedded in said first outside surface to create a residual compressive stress in said first member around said hole, said shank having a recessed portion axially spaced from said head within the range of compressive cold flow of material of said first member as said head is embedded in said first outside surface;
   and a collar having a bore extending between inner and outer bearing surfaces thereof and being adapted to be engaged over that portion of said shank projecting from said second outside surface and adapted to be embedded in said second member at said second outside surface, said collar having axially projecting means extending from said inner bearing surface thereof and being radially spaced from said bore for causing a controlled cold flow of material of said second member in the vicinity of said hole as said collar is embedded in said second outside surface to create a residual compressive stress in said second member around said hole, said bore of said collar and the outside surface of said shank to be engaged by said collar being so shaped and dimensioned that upon upset of said rivet said shank expands radially in said hole to develop an interference fit between said shank and said first and said second members and create residual tensile stresses in said first and said second members which are superimposed upon said residual compressive stresses in said first and said second members.

2. A fastening unit according to claim 1 wherein said recessed portion of said rivet shank is an annular groove located between said rivet head and the midpoint of said rivet shank.

3. A fastening unit according to claim 1 wherein said axially projecting means of said rivet comprises a ridge on the underside of said rivet head and integral with said rivet head.

4. A fastening unit according to claim 3 wherein said ridge is located at the periphery of said underside of said rivet head.

5. A fastening unit according to claim 3 wherein said axially projecting means of said collar comprises a first ridge on said inner bearing face of said collar and integral with said collar.

6. A fastening unit according to claim 5 wherein said first ridge on said inner bearing face of said collar is located at the periphery of said collar.

7. A fastening unit according to claim 6 wherein said outer bearing face of said collar has a second peripheral ridge identical in shape and location to said first peripheral ridge.

8. A fastening unit according to claim 2 wherein said annular groove has a semicircular cross-section.

9. A fastening unit according to claim 3 wherein said ridge on said underside of said rivet head has a semicircular cross-section.

10. A continuous and uninterrupted collar of relatively hard material adapted to be engaged over the tail of a rivet and having a bore extending between first and second end faces thereof, said first end face being substantially perpendicular to the axis of said collar and having a single first circular ridge shaped to be embedded in a structural member, said circular ridge being solid throughout its cross-section and radially spaced from said bore a sufficient distance for causing controlled cold flow of material of said member in the vicinity of a hole in said member from which said rivet tail is to project to create a residual compressive stress in said member around said hole.

11. A collar according to claim 10 wherein said second end face of said collar opposite from said first end face has a second circular ridge identical in shape and location to said first circular ridge.

12. A method of securing together a stack of members made of material capable of being extruded and having a hole extending from a first side of said stack to a second side of said stack comprising:
   placing members capable of being extruded in a stack and providing a hole in said stack extending from a first side of said stack to a second side of said stack;
   passing the shank of a headed rivet through said hole and positioning the underside of the head of said rivet against said first side;
   driving said head into said stack at said first side to embed said head and develop a residual compressive stress in said stack along a selected length of said hole from said first side;
   placing a collar over the tail of said rivet and positioning a bearing surface of said collar against said second side;
   driving said collar against said stack and embedding said bearing face of said collar into said second side to develop a residual compressive stress in said stack along a selected length of said hole from said second side;
   and upsetting said tail of said rivet to expand radially said shank of said rivet against the surface of said hole to develop an interference fit between said rivet shank and said stack and superimpose residual tensile stresses on said residual compressive stresses.

13. A method according to claim 12 wherein said rivet head is driven completely into said stack so that the top of said rivet head is flush with said first side.

14. A method according to claim 12 wherein only a portion of said collar is driven into said stack.

15. A joint comprising:
   a first member made of material capable of being extruded and having a first hole, the material of said first member surrounding said first hole conditioned to have a residual tensile stress superimposed upon a residual compressive stress;
   a second member made of material capable of being extruded and positioned adjacent said first member and having a second hole aligned with said first hole, the material of said second member surrounding said second hole conditioned to have a residual tensile stress superimposed upon a residual compressive stress;

a rivet having a head embedded in an outside surface of said first member by cold flowing and a shank tightly fitted within said first and said second holes and extending from said head to beyond an outside surface of said second member and terminating in a flared tail, said shank having a recessed portion into which cold flow material of said first member extends, said head having axially projecting means on the underside thereof for causing a controlled cold flow of said material of said first member;

and a collar having a bearing face embedded in said outside surface of said second member by cold flowing, said collar being tightly fitted on that portion of said rivet shank extending beyond said outside surface of said second member and tightly clamped between said flared tail of said rivet shank and said outside surface of said second member, said collar having axially projecting means on said bearing face for causing a controlled cold flow of said material of said second member.

16. A joint according to claim 15 wherein said rivet head is completely embedded in said first member.

17. A joint according to claim 15 wherein the volume of said rivet head embedded in said first member is greater than the sum of the volume of said recessed portion of said rivet shank plus the volume of the clearance between said rivet shank and said first member before said rivet head is embedded in said first member.

18. A fastening unit for securing together a stack of members positioned adjacent one another and having a hole extending from a first surface of said stack to a second surface of said stack comprising:

a rivet having an enlarged head adapted to be embedded in said first surface and a shank adapted to pass through said hole and project from said second surface, said head having a circular ridge on the underside thereof and being radially spaced from said shank for causing controlled cold flow of material of the member into which said head is to be embedded ind the vicinity of said hole as said head is embedded to create a residual compressive stress around said hole, said shank having a recessed portion adjacent said head for receiving cold flow material of said member into which said head is embedded;

and a collar having a bore and being adapted to be engaged over that portion of said shank projecting from said second surface and adapted to be embedded in said second surface, said collar having a circular ridge on a bearing face thereof and being radially spaced from said bore for causing controlled cold flow of material of the member into which said collar is to be embedded in the vicinity of said hole as said collar is embedded to create a residual compressive stress around said hole, said bore of said collar and the surface of said shank to be engaged by said collar being so shaped and dimensioned that upon upset of said rivet said shank expands radially in said hole to develop an interference fit between said shank and said stack and create residual tensile stresses which are superimposed upon said residual compressive stresses.

References Cited

UNITED STATES PATENTS

| | | | |
|---|---|---|---|
| 251,788 | 1/1882 | Marker | 85—37 |
| 795,553 | 7/1905 | Sherman | 85—50X |
| 1,102,871 | 7/1914 | Carroll | 85—50UX |
| 1,652,648 | 12/1927 | Swangren | 85—50 |
| 3,002,544 | 10/1961 | Buechting | 151—36 |
| 3,127,919 | 4/1964 | Swanstrom | 151—37 |
| 3,215,024 | 11/1965 | Brilmyer et al. | 85—7 |
| 3,215,026 | 11/1965 | Davis | 151—41.73 |
| 3,242,962 | 3/1966 | Dupree | 151—41.73 |

FOREIGN PATENTS

| | | | |
|---|---|---|---|
| 167,888 | 6/1956 | Australia | 151—37 |
| 588,464 | 1/1925 | France | 85—50 |

RAMON S. BRITTS, Primary Examiner

U.S. Cl. X.R.

29—522, 526; 85—37